United States Patent [19]

Krick et al.

[11] 3,769,529

[45] Oct. 30, 1973

[54] SOLID STATE MOTOR CONTROL ON-OFF TIMER

[75] Inventors: John B. Krick, Joppa; Bernard Coleman, Westminster, both of Md.

[73] Assignee: Rowan Controller Inc., Westminster, Md.

[22] Filed: Apr. 24, 1972

[21] Appl. No.: 246,608

[52] U.S. Cl. .......... 307/293, 307/252 F, 317/141 S, 317/142 TD, 328/131

[51] Int. Cl. .......... H03k 17/26

[58] Field of Search .......... 317/141 S, 142 TD; 307/252 F, 293; 328/129–131

[56] References Cited

UNITED STATES PATENTS

| | | | |
|---|---|---|---|
| 3,575,639 | 4/1971 | Shaw et al. | 317/141 S |
| 3,641,397 | 2/1972 | Elliot et al. | 317/141 S |
| 3,644,793 | 2/1972 | Ilk | 317/141 S |
| 3,688,130 | 8/1972 | Granieri | 307/252 F |

*Primary Examiner*—Stanley D. Miller, Jr.
*Attorney*—Ostrolenk, Faber, Gerb & Soffen

[57] ABSTRACT

A solid state timing means incorporating an electronic timing relay utilizing all solid state components for controlling relays, contactors, solenoids and the like. The timer may be operated in either of two modes of operation, i.e., an "on" delay or an "off" delay, by the operation of a selector switch provided on the timer to select the desired mode of operation. The timing period of the selected time delay is adjustable over a range of the order of from 0.1–100 seconds.

8 Claims, 1 Drawing Figure

PATENTED OCT 30 1973 3,769,529
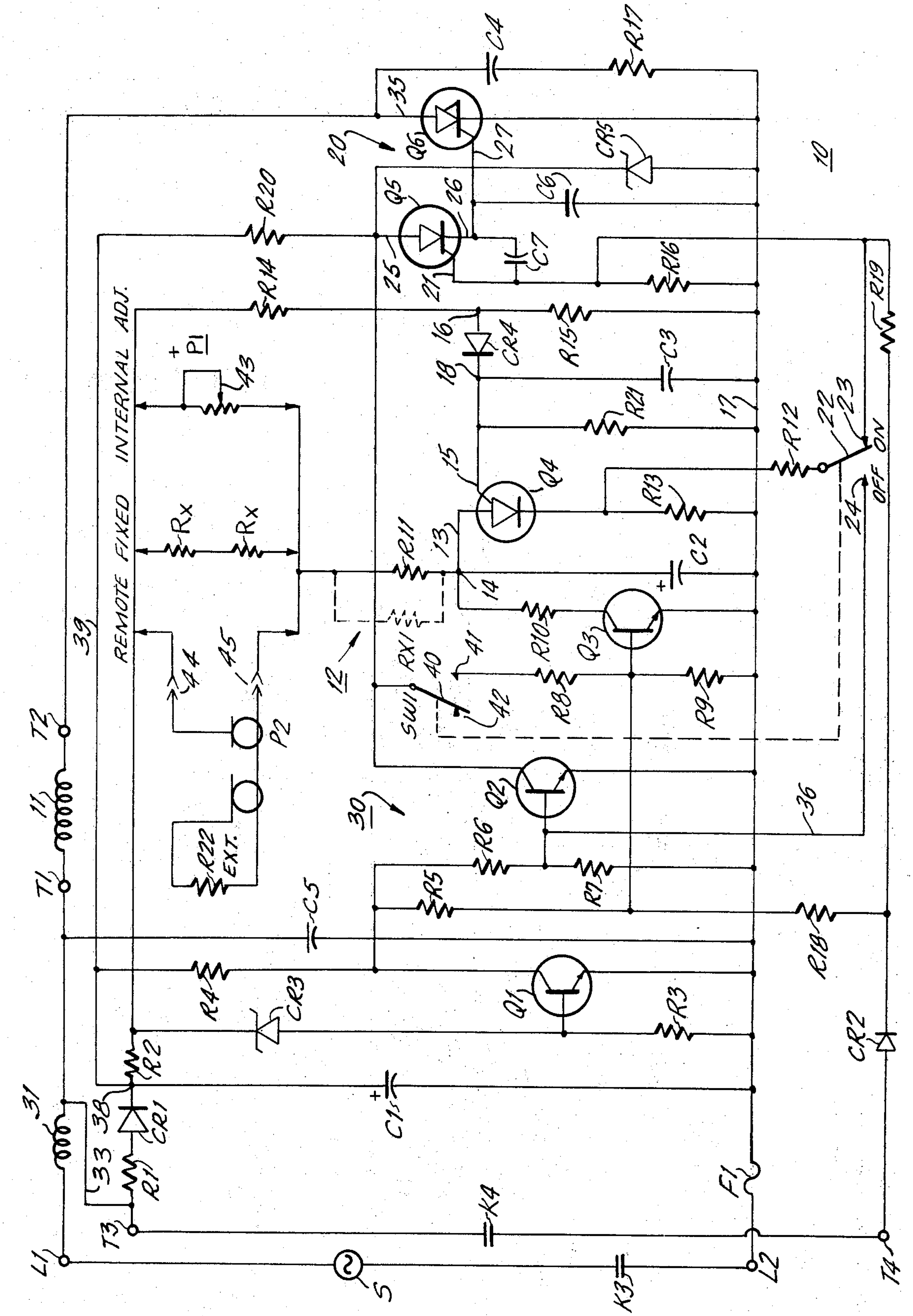

SOLID STATE MOTOR CONTROL ON-OFF TIMER

The present invention relates to control means and more particularly to a novel time delay device for use in industrial control applications which is automatically adjustable to provide either an "on" or an "off" delay period with the time delay interval being adjustable over a substantially wide range.

BRIEF DESCRIPTION OF THE INVENTION

The present invention is characterized by providing a solid state electronic timing circuit adapted for selectively coupling an a.c. source to a load wherein "on" or "off" time delays of an adjustable time delay interval may be selected by appropriate operation of a selector switch means.

The timing circuit is an electronic solid state device whose reliability is such as to have a repeat accuracy after the first operation at constant voltage and temperature of ±0.5 percent having a first operation accuracy of 2 percent and a voltage sensitivity of ± 0.5 percent per 10 percent line voltage change with a reset time of 50 milliseconds which is the minimum power off time required to achieve specified accuracy upon restart.

The solid state timer is comprised of a rectifier circuit coupled across the a.c. load for developing a regulated d.c. level. This d.c. level is utilized to charge the capacitor of a timing circuit whose time delay is adjustable by means of an adjustable variable resistance element forming part of the timing circuit. A regulated d.c. voltage reference level circuit is coupled across the d.c. output whereby a voltage detector/trigger circuit, preferably comprised of a programmable unijunction transistor (PUT) functions to turn on when the voltage output of the timing circuit applied to its anode exceeds the voltage reference level applied to its gate by a predetermined amount. Switch means are provided to couple the voltage detector/trigger circuit to solid state switch means for turning the switch means on after a predetermined time delay. The solid state switch means is coupled in series with the source and a load to establish a closed circuit path after the elapsed time interval. The circuit remains closed for the selected (adjustable) time delay period until the circuit initiating contacts are closed.

In the "off" delay state, once the initiating contacts are open, the load remains energized until a preset time delay period elapses after which the solid state output switch abruptly opens to disconnect the source from the load.

Reset circuit means are provided to automatically discharge the timing circuit and operate the solid state output switch to the open state until line voltage is reapplied and has reached a predetermined minimum magnitude. Selection of the appropriate "on" or "off" operating mode is simply performed by the operation of a two-position switch, while selection of the appropriate time delay interval is made through the adjustment of an adjustable variable resistance.

OBJECTS OF THE INVENTION

The primary object of the present invention is to provide a novel solid state timing circuit for providing either "on" or "off" time delay operation after initiation of operation.

Another object of the present invention is to provide a novel solid state timer for use in industrial control circuitry and the like to selectively provide either an "on" or an "off" time delay operating mode and which incorporates adjustable means for selecting the time delay interval over a wide range of values and reset means for automatically resetting the circuitry and time delay elements so as to assure proper operation of the cycling timer upon reapplication of the line source.

BRIEF DESCRIPTION OF THE DRAWING

The above as well as other objects of the present invention will become apparent when reading the accompanying description and drawing in which:

The sole FIGURE is a schematic diagram of a solid state timer embodying the principles of the present invention.

DETAILED DESCRIPTION OF THE FIGURE

The solid state timer 10 is an electronic timing relay utilizing all solid state components in a high performance timing circuit for controlling relays, contactors, solenoids and the like and is especially advantageous for use in industrial control circuits. The timer may be operated in either of two modes of operation — "on" delay or "off" delay — by operation of a selector switch provided in the timer to obtain the desired mode of operation. The timing period is adjustable through the manipulation of an adjustable variable resistance element whereby the selected time delay interval may be any value over a range of from 0.1 second to 100 seconds The load 11 to be controlled is connected to terminals T1 and T2. A line source S is coupled across line terminals L1 and L2. Terminals T3 and T4 represent the initiating contact terminals and function in a manner to be more fully described. These terminals are disconnected in the "on" delay mode of operation.

To initiate the "on" delay mode timing cycle, the initiating contact K3 is closed by any suitable means (not shown for purposes of simplicity) to couple line source S to terminals L1 and L2. Once the preset time delay period elapses the normally open solid state output switch Q6 closes, energizing the load for an indefinite period or at least until the initiating contacts (to be more fully described) are closed.

POWER SUPPLY

The series circuit comprised of resistor R1, diode CR1 and capacitor C1 function as a half wave rectifier and filter to provide a source of unregulated voltage for operation of the timing and control circuits. In order to achieve the specified accuracy over line voltage variations and operating ambient temperature changes, the timing circuit requires a regulated d.c. power supply voltage. The regulated source consists of zener diode CR3 coupled to the cathode of diode CR1 through resistor R2. The regulated source further comprises a transistor Q1 which functions as part of the reset circuitry in a manner to be more fully described. The positive temperature coefficient of zener diode CR3 is partly compensated by the negative temperature coefficient existing between the base and emitter junction of transistor Q1.

TIMING CIRCUIT

The timing circuit 12 consists of an RC network which includes adjustable potentiometer P1 connected in series with resistor R11 and timing capacitor C2, which series branch is coupled across the regulated D.C. supply output. A voltage detector/trigger which comprises a programmable unijunction transistor (PUT) Q4 has its anode 13 coupled to the common terminal 14 between resistor R11 and capacitor C2. The gate electrode 15 of Q4 is coupled to a voltage reference source comprised of resistors R14 and R15 which are series connected and applied across the regulated d.c. output. The series connected diode CR4 and capacitor C3 are coupled across the common terminal 16 between resistors R14 and R15 and common bus 17. The common terminal 18 between diode CR4 and capacitor C3 is coupled to the gate terminal 15 of Q4. Q4 is adapted to trigger on once the voltage developed across timing capacitor C2 exceeds the voltage of the reference voltage circuit developed at terminal 16. Diode CR4 and resistor R15, as well as resistor R21, are connected in parallel across capacitor C3 and provide a high impedance filtered reference voltage source for the PUT Q4.

The negative temperature coefficient Vak of diode CR4 is used to compensate for the Vag diode in the PUT Q4. Capacitor C3 functions as a filter to prevent negative transients from triggering Q4 prematurely. The output of the timing circuit is a pulse developed across resistor R13 when Q4 is triggered on. Q4 is triggered on after the voltage level at terminal 14 develops to a value slightly exceeding that appearing at the Q4 gate 15.

OUTPUT CIRCUIT

The output circuit 20 is comprised of an SCR Q5 and a triac Q6. In the "on" delay mode of operation, the output pulse from timing circuit 12 is coupled to the gate 21 of Q5 by way of resistor R12 when switch SW1 has its switch arm 22 engaging stationary contact 23 so as to be in the "on" position. The output pulse developed by Q4, which is positive relative to bus 17, triggers SCR Q5 to the "on"(conducting) state. Q5 remains on after the pulse decays due to the fact that the anode current of Q5, applied to anode 25 through resistor R20, exceeds the minimum holding current. The anode current developed by Q5 splits in the SCR with part of the current leaking out of the SCR gate 21 through resistor R16 to bus 17 and through resistors R12 and R13 to bus 17, with the remainder of the current flowing out of the SCR cathode 26 to gate 27 of triac Q6. The current flow into gate 27 of Q6 triggers the triac into the conducting state in which it is maintained conducting so long as the gate current is present. Resistor R16 functions as a gate bias resistor for Q5 to prevent Q5 from turning on due to leakage current flow in the SCR gate circuit. Capacitor C7, which is coupled across the gate and cathode electrodes 21 and 26, bypasses high frequency energy (RFI) around the SCR gate to prevent transient triggering. Zener diode CR5 which is coupled between the anode 25 of Q5 and bus 17, provides a fixed minimum load on the power supply and is switched out of the circuit once Q5 is rendered conductive. CR5 also functions as a voltage clamp to allow the use of a low voltage SCR for Q5 and a low voltage transistor Q2 in the reset circuit. The function of transistor Q2 will be described hereinbelow.

The resistor capacitor network R17–C4 functions as a snubber to reduce commutated dv/dt to less than approximately 1 volt per microsecond to assure that triac Q6 will not continue to retrigger once the gate current has been removed in applications where the timer is employed to control a highly inductive load.

RESET CIRCUITRY

The reset circuit 30 performs two functions, namely; (1) resetting the timing capacitor C2, and (2) resetting the output circuit (to insure that Q5 attains the blocking state) upon closure and opening of the initiating contact.

As power is applied to timer 10 by closure of initiating contact K3, the power supply across filter capacitor C1 starts to increase in half cycle increments toward an average d.c. level. Prior to the time that the voltage across capacitor C1 achieves a predetermined value below the average d.c. level, zener diode CR3 does not conduct, causing transistor Q1 to remain off and thereby allowing current from the power supply to flow through resistors R4 and R6 to saturate transistor Q2. Current also flows through resistors R4 and R5 to the base of transistor Q3 to saturate this transistor. With transistor Q2 conducting, a voltage drop across the transistor of a mere fraction of a volt is applied across SCR Q5 to turn Q5 off. Conduction of transistor Q3 establishes a discharge current path for timing capacitor C2 to discharge capacitor C2 preparatory to operation of the circuitry.

Once the power supply voltage has developed to a level sufficient to cause zener diode CR3 to conduct, transistor Q1 is turned on to remove the base drive from the base electrodes of transistors Q2 and Q3 causing these transistors to be turned off.

If initiating contact K3 is opened either prior to or after the time delay has elapsed, or if power fails and a voltage across capacitor C1 drops below a level sufficient to cause zener diode CR3 to turn off, reset transistor Q1 is again turned off to allow transistors Q2 and Q3 to reset their respective circuits in the manner described hereinabove.

TRANSIENT SUPPRESSION CIRCUITRY

The transient suppression circuitry consists of an LC filter network comprised of an RF choke 31 and capacitor C1 which functions to reduce the transient level from approximately 1,500 volts to less than 400 volts (which is a maximum blocking voltage of triac Q6) and which serves in conjunction with the series connected capacitor C4 and resistor R17 coupled across triac Q6 to reduce the dv/dt to less than 1 volt/microsecond to prevent dv/dt triggering of the triac. Capacitor C6 coupled between the GATE of Q6 and common bus 17 is employed to bypass conductor RFI around the triac gate to prevent transient triggering.

FUSING

The solid state timing circuit contains an ultrafast current limiting fuse F1 coordinated to prevent damage to the normally open solid state output switch Q6 due to either a short circuit condition in the load circuit or due to current surges resulting from high energy transient suppressed upon the power circuit which exceed the limits of the LC transient rejection circuit.

OFF DELAY MODE OPERATION

In the "off" delay mode of operation, the load 11 to be controlled is again connected across terminals T1 and T2 while source S is coupled across terminals L1 and L2. To initiate the "off" delay mode of operation, the initiating contact K4 connected across control terminals T3 and T4 are closed by any suitable means so as to close normally open solid state output switch Q6 and thereby energize the load. This results in the fact that contact terminal T5 is connected to source S through terminal L1, RF choke 31 and lead 33. With the closure of contact K4, contact terminal T3 is connected to contact terminal T4 which, in turn, is coupled to gate 21 of Q5 through diode CR2 and resistor R19. This turns Q5 on to develop driving current which is applied to the gate 27 of Q6 to turn Q6 on.

During the period of time that the initiating contact K4 is closed, the timing circuit remains inhibited. Once the initiating contact K4 is open, the load will remain energized until the preset time delay period elapses and the normally open solid state output switch opens.

In the "off" delay mode of operation, terminals L1 and L2 are continuously connected to source S with contact K3 being closed. The power supply circuit provides the same unregulated and regulated output as was described hereinabove.

In the "off" delay mode of operation, contact K4 being closed, Q5 is triggered on by the RMS half wave input applied to Q5 through diode CR2 and resistor R19. Q5 remains on due to the fact that the anode current exceeds the minimum holding current required. The anode current splits in the SCR, part of the current leaking out of the gate through resistor R16 with the remainder of the current flowing out of the cathode to gate 27 of triac Q6. The current flow into the triac gate triggers the triac into the conducting state in which it remains as long as gate current is present so as to energize external load 11. The output circuit remains in the energized condition until reset by transistor Q2 at the end of the time delay period.

The output pulse of the timing circuit causes transistor Q2 to turn on and saturate due to the fact that switch arm 22 of switch SW1 engages stationary contact 24 in the "off" operating mode to apply its output pulse to the base of Q2 through lead 36. Transistor Q2 diverts the normal anode holding current from SCR Q5 causing the SCR to revert to the blocking or off state. Turn off Q5 removes gate drive from gate 27 of triac Q6 and, in turn, causes Q6 to turn off at the next current zero crossing of the a.c. signal applied to its anode 35 by source S. Resistor R16 and capacitor C7 and zener diode CR5 perform the same functions as have been described hereinabove in connection with the description of the "on" operating mode. Likewise, resistor capacitor network R17-C4 functions in the manner described hereinabove.

The timing circuit for the "off" delay mode of operation functions identical to the "on" delay mode of operation as was described hereinabove. The timing circuit is controlled by transistor Q3. After a line source S is applied to timer terminals L1 and L2, but prior to closing the initiating contact K4, transistor Q3 is turned on (saturated) by way of current flow from the unregulated d.c. supply (terminal 38) through lead 39, resistor R20 and a second switch arm 40 of switch SW1 which engages stationary contact 41 in the "off" operating mode to apply the unregulated d.c. supply to the base of Q3 through resistor R8. This prevents timing capacitor C2 from charging by diverting current around the timing capacitor through resistor R10 and transistor Q3. This condition exists until the initiating contact K4 closes to trigger Q5 on through CR2 and R19 as was previously described. Once Q5 is turned on, the anode voltage drops on anode electrode 25 to remove base drive from transistor Q3 (through switch arm 40 and contact 41). However, Q3 is now turned on during each positive half cycle by the current flow through diode CR2 and resistor R18 so as to discharge timing capacitor C2. Once the initiating contact K4 opens, transistor Q3 is turned off, thereby allowing timing capacitor C2 to charge. Once the voltage across C2 exceeds the reference voltage at terminal 16, PUT Q4 triggers on to develop an output pulse across R13. This pulse is coupled by way of resistor R12, switch arm 22 of switch SW1 and stationary contact 24 couple this pulse to the base of transistor Q2. Transistor Q2 turns on and saturates for 10 milliseconds to reset Q5 in the same manner as was described hereinabove.

The reset circuit operates in the "off" delay mode in that it only resets Q5 to the "off" or blocking state when power is applied to line terminals L1 and L2. The transient suppression circuitry and fuse described hereinabove in connection with the "on" operating mode operates in substantially the identical manner when the timing circuit is operated in the "off" operational mode.

It can be seen from the foregoing description that the present invention provides a novel solid state timer for use in either an "on" or an "off" timing mode of operation by simple control of a two position switch wherein adjustment of the timing interval in either of the two modes of operation is made through simple adjustment of the movable arm 43 of an adjustable potentiometer P1. If it is desired to provide remote adjustment, a pair of contacts 44 and 45 are provided for receiving either an external resistance R22 or an external potentiometer P2 which may be selectively connected across terminals 44 and 45 to further adjust the time delay interval.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A solid state timer for selectively coupling an a.c. source to a load to provide either an "off" or an "on" delay mode of operation comprising:

rectifying means coupled across said source for developing a d.c. output;

a timing circuit coupled across said d.c. output and comprising a variable resistance and a time delay element;

a voltage detecting means having a gate and an anode electrode;

a voltage reference circuit coupled between said d.c. output and said gate for developing a reference voltage level;

said anode being coupled to said timing element for turning said voltage detection means on when the voltage developed by said timing element exceeds said reference level;

a solid state switch coupled in series with said source and said load, said switch having a gate input;

control means coupled across said d.c. output and having a control input and an output coupled to the gate of said solid state switch;

two position switch means having a first switch position for coupling said voltage detection means to said control input to turn said control means on when said voltage detection means is turned on;

said solid state switch being turned on when said control means is turned on;

first reset means coupled between said d.c. output and said timing circuit for preventing operation of said timing element whenever the output of said source is below a predetermined level;

said first reset means including second reset means for turning off said control means whenever said first reset means is activated to thereby turn off said solid state switch.

2. The solid state timer of claim 1 wherein said switch means includes a second switch position for disconnecting said voltage detection means from said control input and for connecting sid voltage detection means to said second reset means for turning off said solid state switch when said voltage detection means is turned on.

3. The solid state timer of claim 2 further comprising:

a half-wave rectifier;

second switch means having a first open position and a second closed position for connecting said source to said control input and to said first and second reset means through said half-wave rectifier to turn on said control means and said solid state switch and to prevent said time delay element from operating;

said first and second reset means being turned off to enable said solid state switch means to turn off after the voltage across said timing element exceeds said reference level when said second switch means is operated to its first open position.

4. The solid state timer of claim 1 wherein said timing element is a capacitor and said variable resistance is a potentiometer having an adjustable arm.

5. The solid state timer of claim 1 wherein said first reset means comprises a first transistor means having an input and an output;

a zener diode coupled between the input of said first transistor means and said d.c. output for preventing conduction of said first transistor means when the d.c. output falls below a predetermined level; and second transistor means having an input coupled to said d.c. output and the output of said first transistor means and having an output coupled to said timing element for deactivating said timing element when said first transistor means is turned off.

6. The solid state timer of claim 5 wherein said second reset means is comprised of third transistor means, coupled to the output of said first transistor means and said d.c. output and an output coupled to said control means for turning off said control means and said solid state switch when said first transistor means is turned off.

7. The solid state timer of claim 6 further comprising:

a half-wave rectifier;

second switch means having a first open position and a second closed position for connecting said source to said control input and to said inputs of said second and third transistor means through said half-wave rectifier to turn on said control means and said solid state switch and to prevent said time delay element from operating;

said second and third transistor means being turned off to enable said solid state switch means to turn off after the voltage across said timing element exceeds said reference level when said second switch means is operated to its first open position.

8. The solid state timer of claim 7 wherein said two-position switch means further includes means for connecting a resistance element across the output of said second transistor means when said two-position switch means is in its second position.

* * * * *